United States Patent

Anderton et al.

Patent Number: 6,102,408
Date of Patent: Aug. 15, 2000

[54] TRACK LINK ASSEMBLY HAVING A RESILIENTLY BONDED PROTECTIVELY COATED SEAL MEMBER AND ASSOCIATED METHOD FOR MAINTAINING A TRACK LINK ASSEMBLY

[75] Inventors: Peter W. Anderton; Roy D. Morley, both of Peoria, Ill.

[73] Assignee: Caterpillar Inc., Peoria, Ill.

[21] Appl. No.: 08/922,915

[22] Filed: Sep. 3, 1997

[51] Int. Cl.⁷ .................................................. B62D 55/088
[52] U.S. Cl. .......................... 277/370; 277/405; 305/103
[58] Field of Search .................................. 305/100, 103; 384/140, 482; 277/370, 377, 380, 384, 402, 405, 585, 407, 406

[56] References Cited

U.S. PATENT DOCUMENTS

| | | | |
|---|---|---|---|
| Re. 32,646 | 4/1988 | Wentworth | 277/40 |
| 3,235,315 | 2/1966 | Schnacke | 277/380 X |
| 3,554,560 | 1/1971 | Miyake | 305/102 X |
| 3,624,809 | 11/1971 | Benings | 277/405 |
| 3,874,680 | 4/1975 | Mustoe et al. | 277/405 |
| 3,926,443 | 12/1975 | Fenerty et al. | 277/405 |
| 4,094,514 | 6/1978 | Johnson | 305/103 |
| 4,099,728 | 7/1978 | Wiese | 277/399 |
| 4,111,436 | 9/1978 | Yazawa | 277/381 |
| 4,199,199 | 4/1980 | Granda | 277/402 X |
| 4,268,040 | 5/1981 | Bainard et al. | 277/307 |
| 4,295,654 | 10/1981 | Kawamura et al. | 277/380 |
| 4,327,921 | 5/1982 | Reinsma et al. | 277/384 |
| 4,421,327 | 12/1983 | Morley et al. | 277/381 |
| 4,436,315 | 3/1984 | Hatch et al. | 277/370 |
| 4,704,332 | 11/1987 | Brennan et al. | 428/428 |
| 4,784,499 | 11/1988 | Fukute | 384/295 |
| 4,819,999 | 4/1989 | Livesay et al. | 305/103 |
| 5,052,697 | 10/1991 | Ishikawa | 277/410 |
| 5,094,466 | 3/1992 | Baker et al. | 277/384 |
| 5,286,115 | 2/1994 | Toji et al. | 384/127 |
| 5,544,896 | 8/1996 | Draskovich et al. | 277/404 |
| 5,826,884 | 10/1998 | Anderton et al. | 277/407 X |

FOREIGN PATENT DOCUMENTS

| | | |
|---|---|---|
| 157834 | 7/1954 | Australia . |
| 2.013.337 | 4/1970 | France . |
| 3-249481 | 11/1991 | Japan . |

*Primary Examiner*—Lynne H. Browne
*Assistant Examiner*—Greg Binda
*Attorney, Agent, or Firm*—Maginot, Addison & Moore

[57] ABSTRACT

A track link assembly includes a first track link having a passageway defined therethrough. The track link assembly also includes a bushing having an end face, wherein the bushing is positioned within the passageway. The track link assembly further includes a first seal member having an exterior surface, the first seal member being secured to the bushing end face with a resilient bond formed by an adhesive such as Loctite adhesive part number 17430. In addition, the track link assembly includes a protective coating secured to the exterior surface of the first seal member, wherein the protective coating and the first seal member are made of different materials relative to each other. An associated method for maintaining a track link assembly is also disclosed.

16 Claims, 7 Drawing Sheets

TRACK LINK ASSEMBLY HAVING A RESILIENTLY BONDED PROTECTIVELY COATED SEAL MEMBER AND ASSOCIATED METHOD FOR MAINTAINING A TRACK LINK ASSEMBLY

BACKGROUND OF THE INVENTION

The present invention generally relates to sealing joints in construction machines. The present invention particularly relates to a track link assembly having a resiliently bonded protectively coated seal member and an associated method for maintaining a track link assembly.

Construction machines, such as crawler tractors, typically include a sprocket, an idler, a track link assembly, and a number of track shoes attached to the track link assembly to form a track group. The aforementioned components cooperate to propel the crawler tractor over the ground.

Track link assemblies generally include a number of bushings and entrained track links. The bushings and track links cooperate to form a number of track joints. Track joints are typically equipped with a track seal assembly to keep out various corrosive and abrasive mixtures of water, dirt, sand, rock or other mineral or chemical elements to which the track link assembly is exposed during its use. The presence of these corrosive and abrasive mixtures in the track joint can damage the track link assembly. The track seal assembly also functions to keep a lubricant within the track joint which facilitates the operation of the track link assembly.

One existing track seal assembly design used in an attempt to accomplish the aforementioned functions employs a sealing member axially urged into sliding sealing engagement against a polished bushing end face by a resilient rubber load ring. However, a number of problems have been encountered using this seal design over long periods of time.

One such problem relates to grooving of the bushing end face. The mixtures of various abrasive particles found in the working environment of the track link assembly tend to make excellent grinding compounds which can wear grooves into the bushing end face. If these grooves become sufficiently deep, the integrity of the track seal assembly can be compromised and abrasive particles can enter the track joint. These grooves also provide a path for the lubricant contained within the track joint to leak out.

The aforementioned problems can cause track joint failure. Therefore, the end faces are periodically inspected to determine the extent of grooving therein. If the grooving is significant the entire bushing is typically replaced which increases the cost of maintaining the crawler tractor.

Another existing track seal assembly design used in an attempt to accomplish the aforementioned functions utilizes an annular wear resistant plate bonded with an adhesive either directly to the end face of the bushing or to an intermediary elastomeric annular plate. While this seal assembly design reduces the problem of grooving in the end face, it introduces another serious problem, that being the failure of the adhesive bond between the bushing end face and the annular wear resistant plate. The failure of the adhesive bond also results in the loss of sealing and subsequent track joint failure.

The present invention is directed to overcoming one or more of the problems set forth above.

SUMMARY OF THE INVENTION

In accordance with one embodiment of the present invention there is provided a track link assembly. The track link assembly includes a first track link having a passageway defined therethrough. The track link assembly also includes a bushing having an end face, wherein the bushing is positioned within the passageway. The track link assembly further includes a first seal member having an exterior surface, the first seal member being secured to the bushing end face. In addition, the track link assembly includes a protective coating secured to the exterior surface of the first seal member, wherein the protective coating and the first seal member are made of different materials relative to each other.

In accordance with another embodiment of the present invention there is provided a method of maintaining a track link assembly. The method includes the steps of (a) providing a track link assembly having (1) a first track link having a passageway defined therethrough, (2) a bushing having an end face, the bushing being positioned within the passageway, (3) a seal member having an exterior surface, the seal member being secured to the bushing end face, and (4) a first protective coating secured to the exterior surface of the seal member, wherein the protective coating and the seal member are made of different materials relative to each other, (b) removing the bushing from the passageway of the first track link, (c) detaching the seal member from the end face of the bushing, (d) providing (1) a replacement seal member having a second exterior surface and (2) a second protective coating secured to the second exterior surface, wherein the second protective coating and the replacement seal member are made of different materials, and securing the replacement seal member to the end face of the bushing.

In accordance with yet another embodiment of the present invention there is provided a track link assembly. The track link assembly includes a first track link having a passageway defined therethrough. The track link assembly also includes a bushing having an end face, the bushing being positioned within the passageway. The track link assembly further includes a first seal member adapted to be positioned on the end face of the bushing. In addition, the track link assembly includes an adhesive which forms a resilient bond between the first seal member and the end face.

BEST MODE FOR CARRYING OUT THE INVENTION

Figure 1:
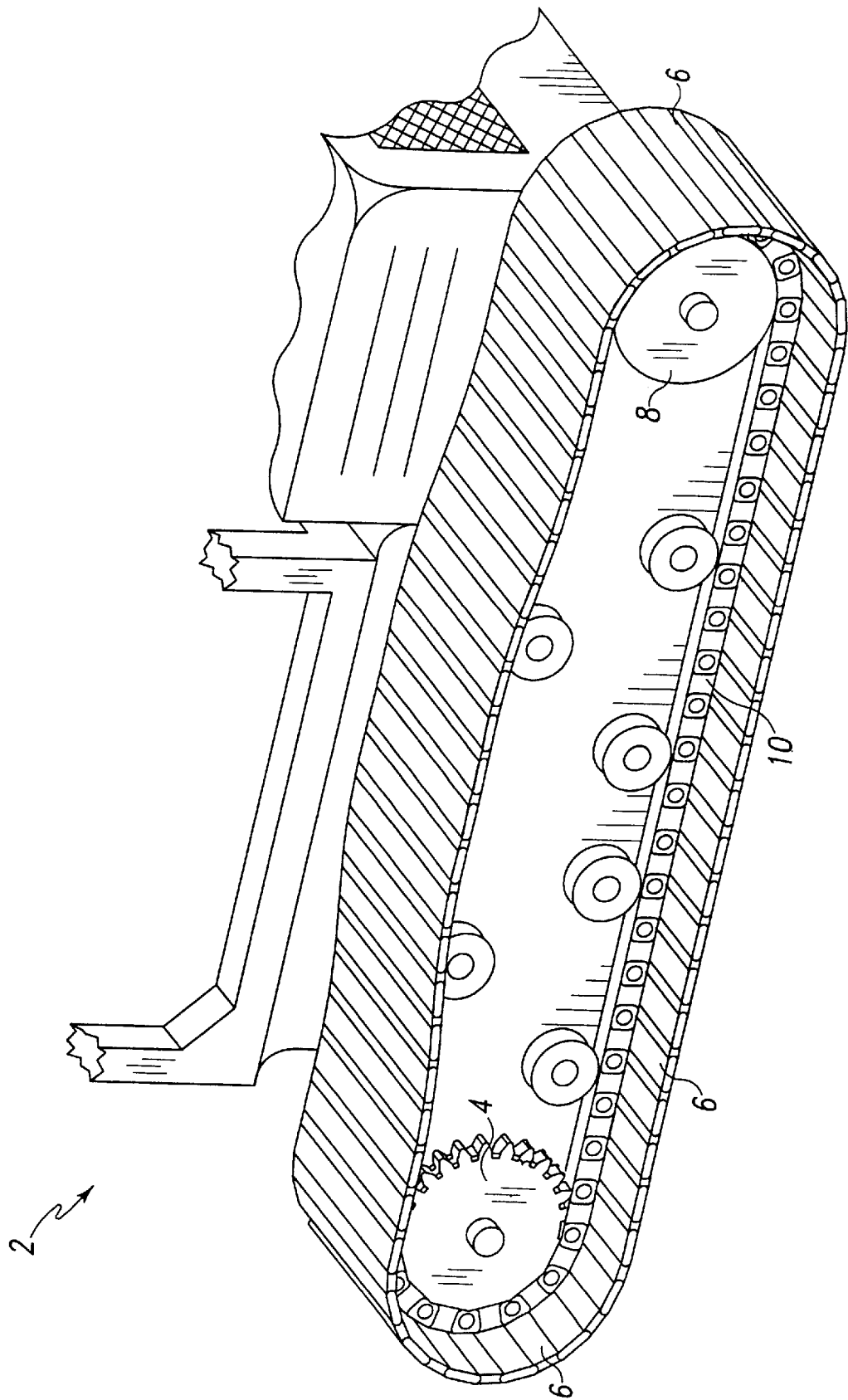
FIG. 1 is a fragmentary perspective view of a crawler tractor having track shoes coupled to a track link assembly which incorporates the features of the present invention therein.

While the invention is susceptible to various modifications and alternative forms, a specific embodiment thereof has been shown by way of example in the drawings and will herein be described in detail. It should be understood, however, that there is no intent to limit the invention to the particular form disclosed, but on the contrary, the intention is to cover all modifications, equivalents, and alternatives falling within the spirit and scope of the invention as defined by the appended claims.

Now referring to FIG. 1, there is shown a crawler tractor 2 having a sprocket 4, an idler 8, a track link assembly 10 entrained around sprocket 4 and idler 8, and a number of track shoes 6 attached to track link assembly 10. In order to propel crawler tractor 2 over the ground, sprocket 4 rotates and engages track link assembly 10. This engagement and rotation causes track link assembly 10, along with the attached track shoes 6, to rotate around a path defined by sprocket 4 and idler 8. Rotation of track link assembly 10 and track shoes 6 around this path causes the track shoes 6 to engage the ground. The engagement of track shoes 6 with the ground causes crawler tractor 2 to be propelled over the ground to perform various work functions.

Figure 2:
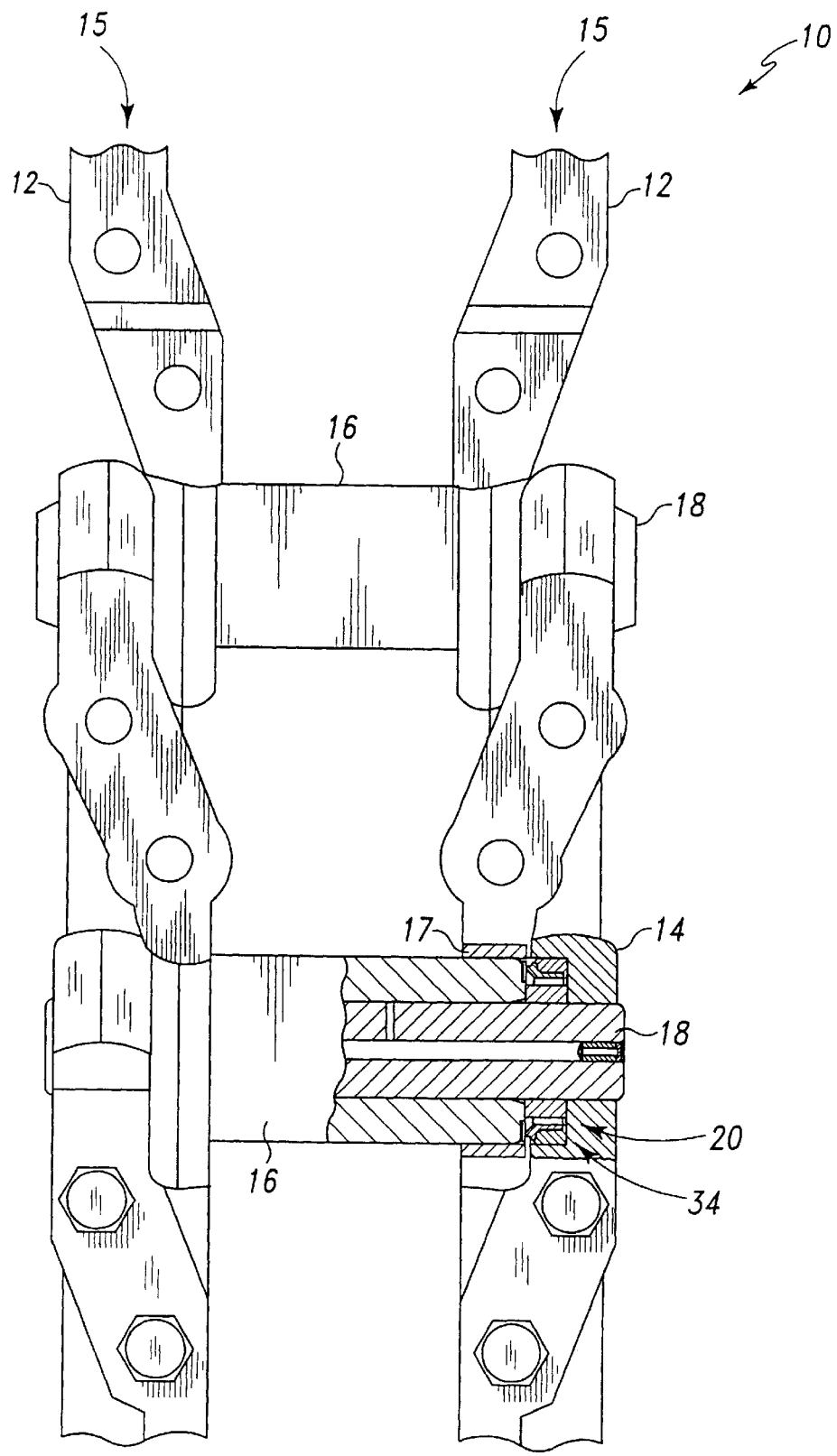
FIG. 2 is a fragmentary elevational view of the track link assembly of FIG. 1 (note that a portion of the track link assembly is shown in a cross sectional view, for clarity of description)

Now referring to FIG. 2, there is shown a section of track link assembly 10 of FIG. 1. Track link assembly 10 includes a pair of master links 12 and track links 14 and 17 entrained to form a pair of parallel chains 15. Track link assembly 10 also includes a series of cylindrically shaped bushings 16 and track pins 18 interposed between and connecting parallel chains 15.

As shown by the cross sectional view, bushing 16 and track link 14 cooperate to form an annular track joint 20 which surrounds track pin 18 contained within bushing 16. Pin 18 has an oil cavity 78 (see FIG. 3) defined therein which is in fluid communication with a cross hole 80 (see FIG. 3). Oil cavity 78 and cross hole 80 function to deliver a lubricant to a space (not shown) between pin 18 and bushing 16, and to track joint 20. Oil cavity 78 has a stopper 82 positioned therein which can be removed to replenish the supply of lubricant contained in oil cavity 78.

Figure 3:
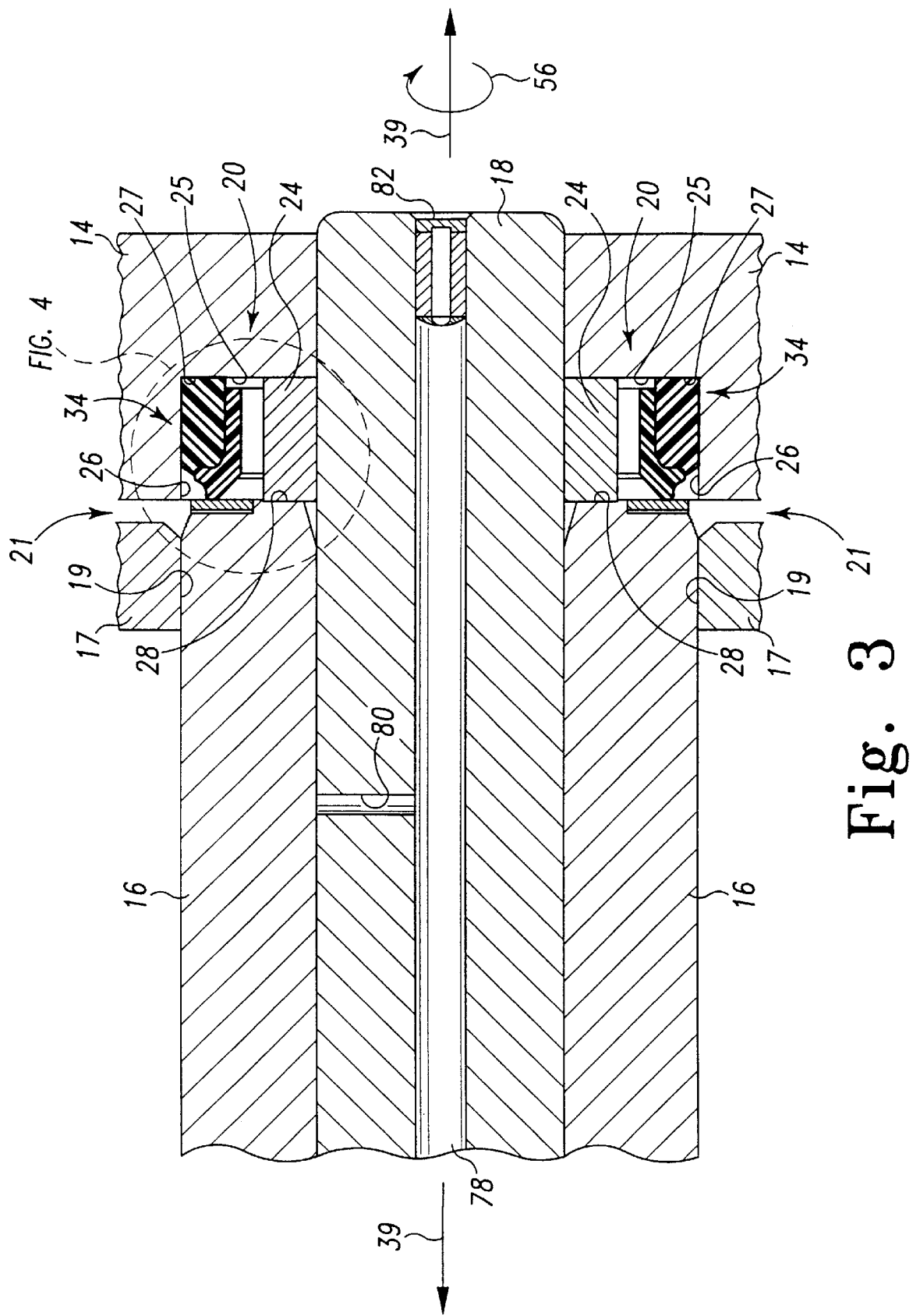
FIG. 3 is an enlarged fragmentary view of the cross section shown in FIG. 2.

One function of track joint 20 is to allow bushing 16 and track link 17 to rotate relative to track link 14 around axis 39 (see FIG. 3) in a direction indicated by arrow 56 (see FIG. 3). Track joint 20 also allows bushing 16 and track link 17 to rotate relative to track link 14 around axis 39 (see FIG. 3) in a direction opposite to the one indicated by arrow 56 (see FIG. 3). During use of track link assembly 10 this rotational movement is necessary in order for track link assembly 10 to function properly. Specifically, track link assembly 10 must articulate at each track joint 20 in order for track link assembly 10 to rotate about sprocket 4 and idler 8 (see FIG. 1). Such rotational movement can also occur when track shoes 6 (see FIG. 1), which are coupled to track link assembly 10, encounter and drive over an obstacle such as a rock.

Figure 4:
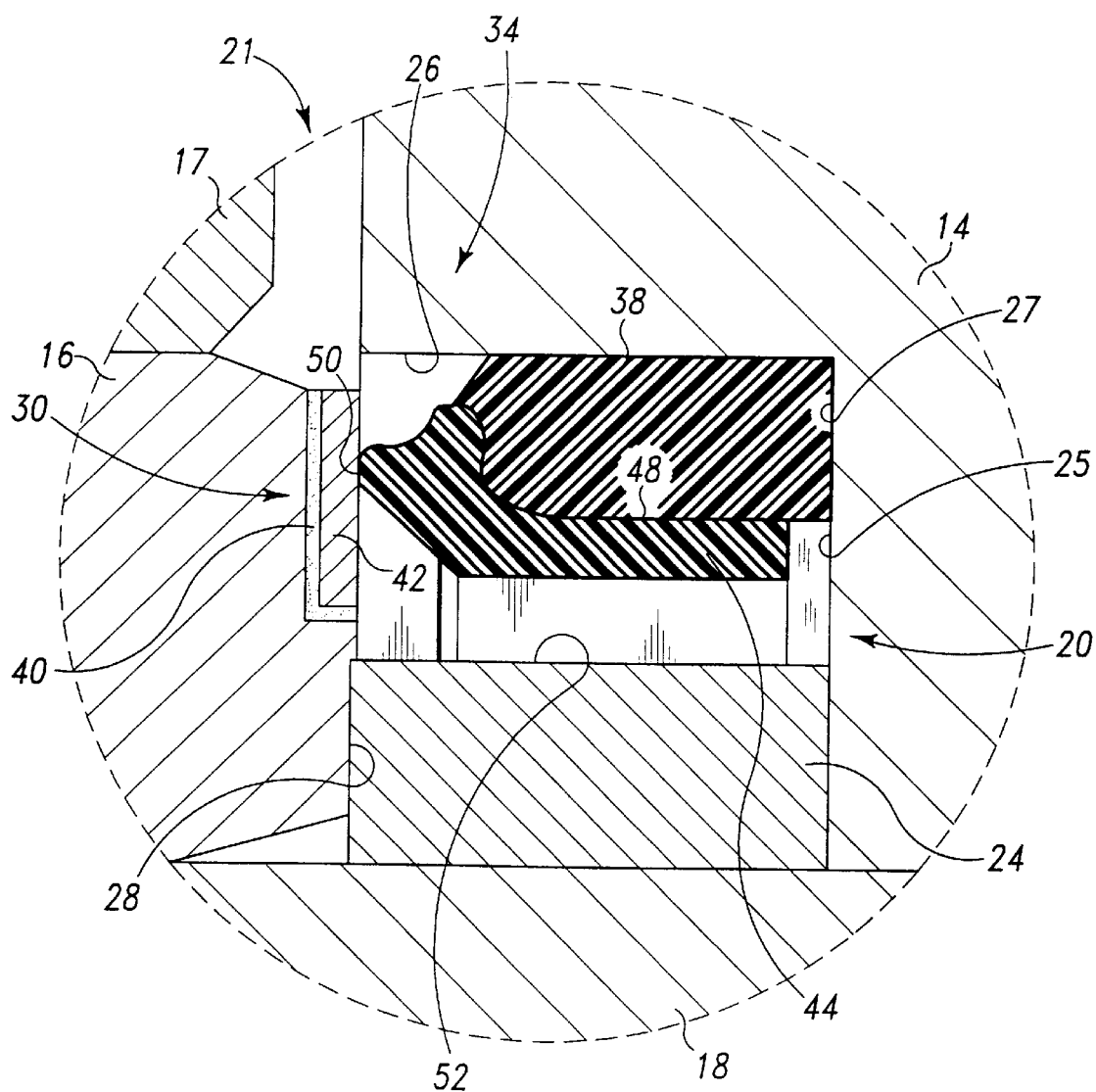
FIG. 4 is an enlarged view of a portion of FIG. 3 which is encircled and indicated as FIG. 4.

Also shown in the cross sectional view of FIG. 2 (see FIG. 3 for more detail), track joint 20 has disposed therein a track seal assembly 34 for keeping a lubricant in seal cavity 52 (see FIG. 4). In addition, track seal assembly 34 functions to keep debris from passing through opening 21 (see FIGS. 3 and 4) and entering seal cavity 52 (see FIG. 4).

As more clearly shown in FIG. 3, track pin 18 is contained within, and is supported by, bushing 16 and track link 14. Bushing 16 is positioned within a passageway 19 defined in track link 17. Track link 14 has a track link counter bore 25 defined therein. Track link counter bore 25 is defined by an axially extending cylindrical surface 26 and a radially extending end surface 27. Bushing 16 has an end portion which defines a ring-shaped bushing face 28. Bushing face 28 includes an annular pilot seat 30 (see FIGS. 4 and 6) or groove defined therein. Bushing face 28 is disposed in an opposing relationship to track link counter bore 25 to form track joint 20.

It should be understood that track joint 20 is an annular chamber which surrounds track pin 18. A thrust ring 24 is disposed intermediate bushing face 28 and radially extending end surface 27 to limit relative movement in the axial direction therebetween. Thrust ring 24 also controls the depth of the annular chamber surrounding track pin 18. Track seal assembly 34 is also disposed intermediate bushing face 28 and radially extending end surface 27. It should also be understood that track seal assembly 34 and thrust ring 24 both form ring-like structures which are in a substantially concentric relationship relative to each other.

As shown in FIG. 4, track seal assembly 34 includes an annular elastomeric load member 38, an annular elastomeric seal member 44, and a metallic annular seal member 42. Load member 38 is positioned between radially extending end surface 27, seal member 44, and axially extending cylindrical surface 26. Seal member 42 is positioned within pilot seat 30 and attached to bushing face 28 with an adhesive 40. Seal member 44 is interposed between seal member 42 and load member 38.

Upon assembly of track joint 20 load member 38 is compressibly loaded between radially extending end surface 27, seal member 44, and axially extending cylindrical surface 26. In its compressibly loaded state, no relative rotational movement occurs between load member 38 and radially extending end surface 27, or between load member 38 and seal member 44, due to the frictional forces between these elements. However, if it becomes necessary under certain conditions or applications, an appropriate adhesive can be interposed between load member 38 and radially extending end surface 27 or seal member 44 to aid in keeping these components relatively stationary.

In its compressibly loaded state, load member 38 also resiliently mounts and exerts a predetermined force on seal member 44 along a drive interface 48. The force communicated to seal member 44 urges the same toward seal member 42 such that a slideable sealing interface 50 is formed between seal member 42 and seal member 44. The previously described arrangement of the aforementioned components results in a seal cavity 52 being formed in track joint 20 by the cooperation of bushing face 28, track seal assembly 34, radially extending end surface 27 and thrust ring 24. Seal cavity 52 contains a lubricant for aiding in the articulation of bushing 16 and track link 17 relative to track link 14 and track pin 18.

Well known processes relating to the size, shape and makeup of load member 38 are used to design its urging function. The aforementioned characteristics of load member 38 can be manipulated to provide the high loads necessary to maintain the integrity of sealing interface 50 and therefore exclude debris from seal cavity 52. However, it should be appreciated that the aforementioned characteristics of load member 38 must also be designed to allow for relative rotational movement between seal member 44 and seal member 42 along sealing interface 50.

Figure 5:
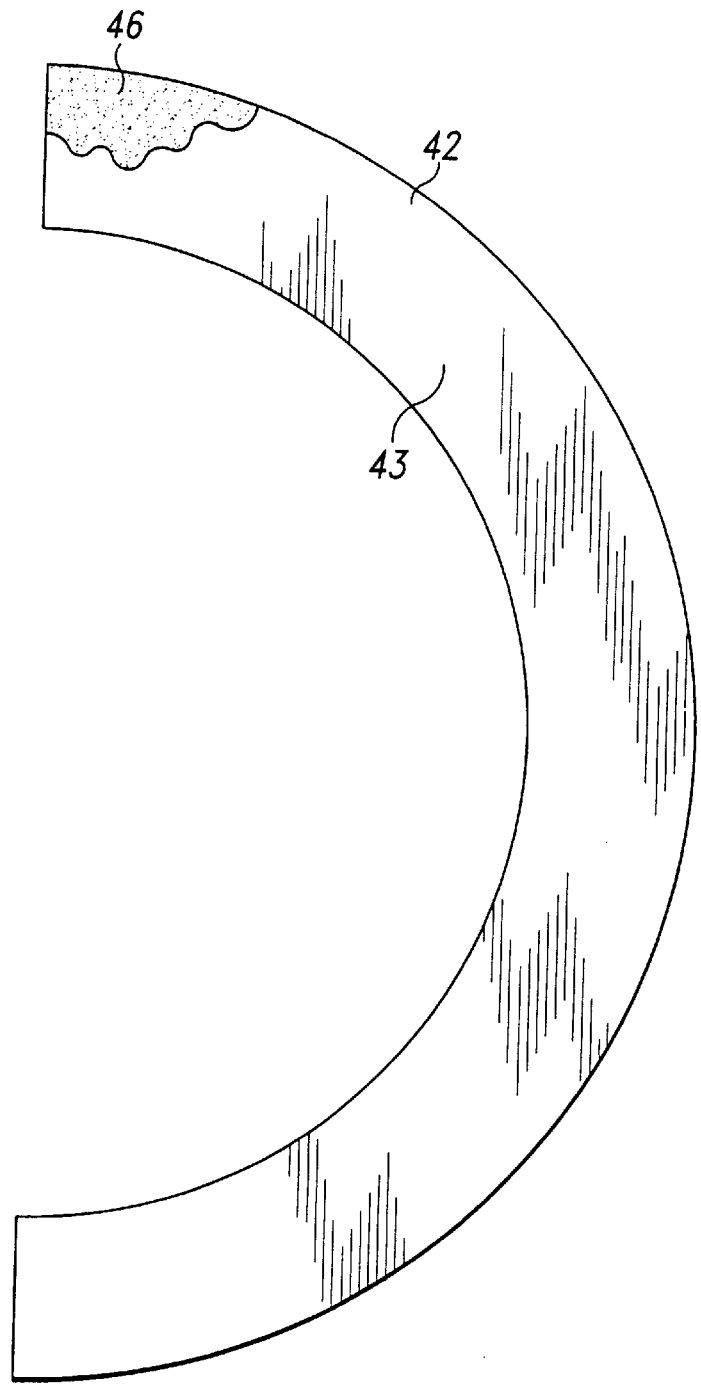
FIG. 5 is a view of the seal member taken along line 5—5 of FIG. 6 as viewed in the direction of the arrows, with a protective coating shown disposed thereon (note that the protective coating is shown disposed on only a portion of the seal member for clarity of description)

Referring now to FIG. 5, seal member 42 has a protective coating 46 secured to an exterior surface 43 thereof. It should be understood that protective coating 46 and seal member 42 are made of different materials relative to each other. For example, seal member 42 can be made of stainless steel 420 and protective coating 46 can be made of a compound selected from the group consisting of chromium nitride, titanium nitride, diamond-like carbon, or other protective coatings 46. One advantage of making seal member 42 out of stainless steel 420 is that stainless steel 420 is resistant to the corrosive environment in which track link assembly 10 is typically used. In addition, it should be understood that protective coating 46 covers the entire exterior surface 43 of seal member 42. Note that, in FIG. 5, only one half of seal member 42 is shown, and only a portion of exterior surface 43 is shown coated with protective coating 46, for clarity of description.

Protective coating 46 can be secured to seal member 42 by processes such as a chemical vapor deposition process, a physical vapor deposition process, a sputtering deposition process, and a plasma spray process. A significant number of seal members 42 can be simultaneously coated with protective coating 46 utilizing the aforementioned processes which helps reduce the cost of the process per seal member 42 coated. The aforementioned processes for securing a protective coating 46 on seal member 42 can be performed by the Multi-Arc Corporation located in West Chicago, Ill.

Securing a protective coating 46, such as chromium nitride or titanium nitride, to exterior surface 43 of seal member 42 is an important aspect of the present invention. Specifically, a protective coating 46 of chromium nitride or titanium nitride is extremely hard and thus resistant to abrasive materials. Thus coating seal member 42 with chromium nitride or titanium nitride makes seal member 42 extremely resistant to abrasive materials. As a result, the previously discussed serious durability or grooving problems associated with using track link assembly in an abrasive environment are significantly reduced.

Protective coating 46 is preferably disposed on exterior surface 43 of seal member 42 to a thickness that sufficiently protects seal member 42 against grooving cause by abrasive materials. However, protective coating 46 should not be disposed on exterior surface 43 of seal member 42 to a thickness that inhibits the coating's ability to adhere to exterior surface 43. For example, if the coating of chromium nitride or titanium nitride secured to exterior surface 43 is too thick, the coating has a tendency to flake off thereby reducing the protection against abrasive materials. On the other hand, if the coating of chromium nitride or titanium nitride secured to exterior surface 43 is too thin, seal member 42 will not be sufficiently protected against the grooving caused by abrasive materials. Therefore, chromium nitride is preferably disposed onto exterior surface 43 to a thickness of about 1–8 micrometers and titanium nitride to a thickness of about 1–20 micrometers. However, chromium nitride is even more preferably disposed onto exterior surface 43 to a thickness of about 5 micrometers utilizing a physical vapor deposition process. In addition, titanium nitride is even more preferably disposed onto exterior surface 43 to a thickness of about 10 micrometers utilizing a chemical vapor deposition process.

Figure 6:
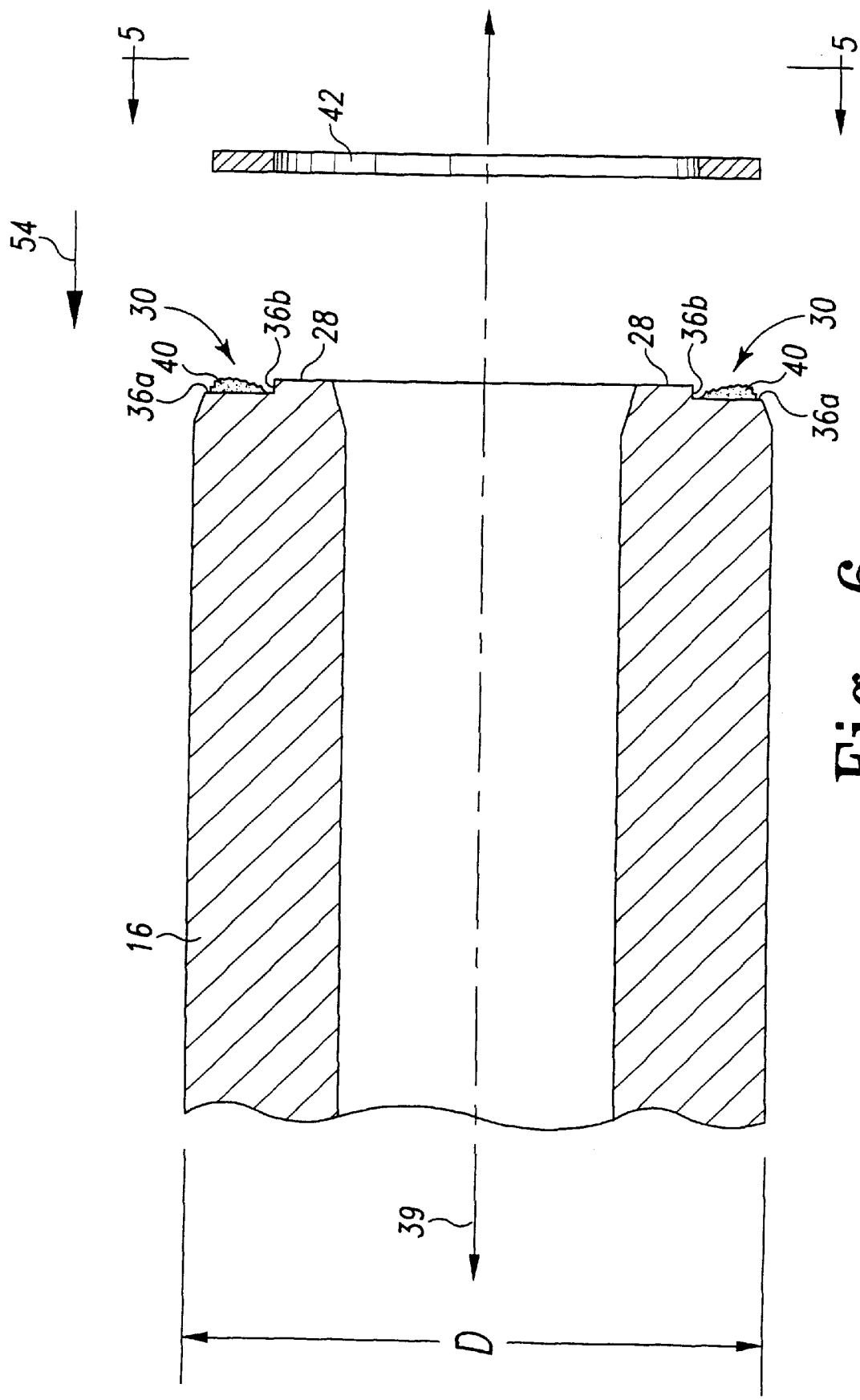
FIG. 6 is an enlarged view of the bushing, adhesive, and seal member shown in FIG. 3, with the seal member detached from the bushing end face for clarity of description.

Referring now to FIG. 6, pilot seat 30 is defined by radially extending pilot surface 36a and axially extending pilot surface 36b. Adhesive 40 is disposed on pilot seat 30. Seal member 42 is positioned relative to bushing 16 such that movement of seal member 42 along axis 39 in the direction indicated by arrow 54 locates seal member 42 within pilot seat 30 (see FIG. 4). Positioning seal member 42 in the above described manner interposes adhesive 40 between seal member 42 and pilot seat 30. It should be appreciated that adhesive 40 is also positioned in contact with seal member 42, pilot surface 36a, and pilot surface 36b. Adhesive 40 forms a resilient bond between seal member 42 and pilot seat 30, thereby securing seal member 42 to bushing 16 such that substantially no relative rotational movement occurs between these two elements.

What is meant herein by the term "resilient bond" is a bond between seal member 42 and pilot seat 30 that is formed by adhesive 40 which remains intact when bushing 16 is compressed or expanded so that its diameter D is changed by an amount approximately equal to +/−0.007 inch. An example of when diameter D of bushing 16 can decrease by approximately 0.007 inch is when bushing 16 is press fit into passageway 19 of track link 17 (see FIG. 3). An example of when diameter D of bushing 16 can increase by approximately 0.007 inch is when bushing 16 is removed from passageway 19 of track link 17 (see FIG. 3). It should be understood that bushing 16 is removed from, and inserted back into, passageway 19 at specific time intervals throughout the life of track link assembly 10 for various maintenance purposes. For example, bushing 16 may be removed from, and then reinserted back into, passageway 19 at intervals of approximately 500 to 1000 service hours. An example of an adhesive that forms a resilient bond, and therefore can be used in the present invention, is Loctite adhesive part number 17430, available from the Loctite Corporation, located in Rocky Hill, Conn.

It should be appreciated that using an adhesive that forms a resilient bond is an important aspect of the present invention since the decrease or increase of the diameter D of bushing 16 in the above described manner would fracture or break a rigid or brittle bond, e.g. a bond formed by soldering or welding. The failure of a rigid bond between seal member 42 and bushing face 28 would result in seal member 42 becoming detached from bushing face 28 thereby causing failure of track seal assembly 34, loss of lubricant and possibly track joint 20 failure. In addition, adhesives such as epoxy resins also form rigid bonds. Therefore, bonds formed by epoxy resins also would not provide the advantages of using a resilient bond between seal member 42 and bushing face 28. On the other hand, a resilient bond is able to stretch and compress, and thus accommodate expansion or compression of bushing 16 throughout its useful life. Thus, a resilient bond will remain intact and the integrity of track seal assembly 34 will be maintained.

Figure 7:
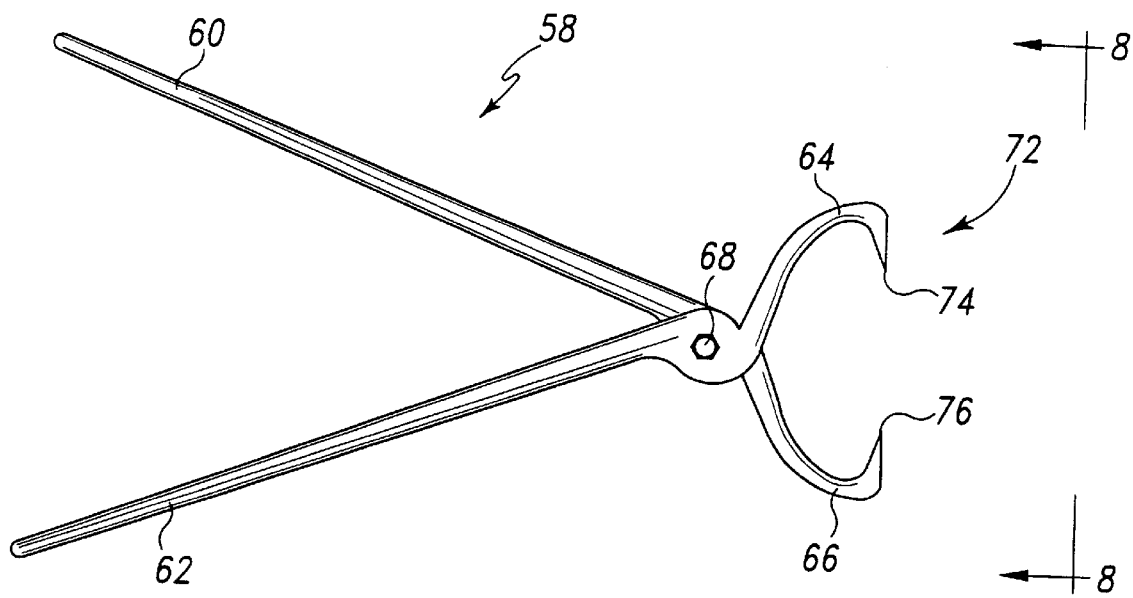
FIG. 7 is a side elevational view of a tool which can be used to detach the seal member from the bushing end face.
Figure 8:
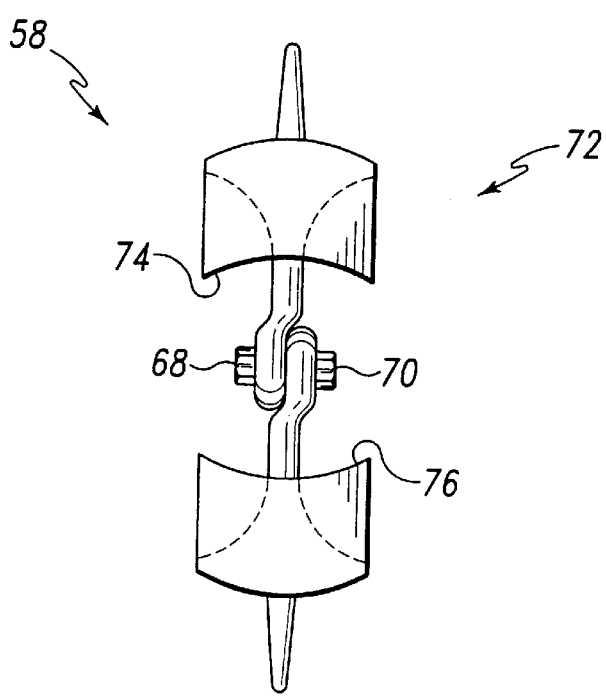
FIG. 8 is a view of the tool taken along line 8—8 of FIG. 7 as viewed in the direction of the arrows (note that a portion of the tool is shown in phantom for clarity of description).

Referring now to FIGS. 7 and 8, tool 58 includes a handle 60 and a handle 62. Handle 60 has a hook member 66 extending therefrom. Handle 62 has a hook member 64 extending therefrom. Hook member 66 has an edge 76 defined thereon. Hook member 64 has an edge 74 defined thereon. Handles 60 and 62 are secured to one another by a bolt 68 and a nut 70 such that hook members 64 and 66 define a C-shaped clamp 72. In addition, handles 60 and 62 are secured to one another such that (1) the movement of handles 60 and 62 toward each other causes the movement of edges 76 and 74 toward each other and (2) the movement of handles 60 and 62 away from each other causes the movement of edges 74 and 76 away from each other.

Tool 58 is utilized to detach seal member 42 from pilot seat 30 in the following manner. Handles 60 and 62 are moved away from each other such that edges 74 and 76 are moved away from each other to a distance slightly larger than diameter D of bushing 16 (see FIG. 6). Tool 58 is then positioned relative to bushing 16 and seal member 42 such that edge 74 and edge 76 are located directly above adhesive 40. Handles 60 and 62 are then moved toward each other such that edges 74 and 76 are forced between seal member 42 and pilot seat 30, thereby cutting through adhesive 40. Handles 60 and 62 are continuously moved toward one another in the above described manner until edges 74 and 76 contact axial extending pilot surface 36b (see FIG. 6). Handles 60 and 62 are then moved away from each other such that edges 74 and 76 are withdrawn from between seal member 42 and pilot surface 36a. Tool 58 is then rotated relative to seal member 42 until edges 74 and 76 are positioned directly over an adjacent uncut portion of adhesive 40, and the above described procedure repeated. A number of cuts are made in adhesive 40 in this manner until seal member 42 can be removed from pilot seat 30.

INDUSTRIAL APPLICABILITY

One of the advantages of the track seal assembly 34 set forth above is that it enables a cost effective method of maintaining track link assembly 10. Specifically, track seal assembly 34 significantly extends the useful life of bushing 16. This is achieved by forming a sealing interface 50 between seal member 42 and seal member 44 rather than between seal member 44 and bushing face 28. Therefore, once seal member 42 wears out or becomes unacceptably grooved, bushing 16 can be removed from passageway 19 of track link 17 and thereafter seal member 42 detached from pilot seat 30 as described above. Once seal member 42 is detached, any residual adhesive 40 or rust remaining attached to pilot seat 30 can be removed therefrom with a wire brush and an acetone wash. After cleaning pilot seat 30, a replacement seal member, substantially identical to seal member 42 (including protective coating 46), is attached to bushing 16 as previously described. Bushing 16 is then inserted back into passageway 19 to reassemble track link assembly 10.

Thus, it should be appreciated that only seal member 42 is discarded when it is worn out as opposed to having to discard the large and more expensive bushing 16. Since seal member 42 is much cheaper to replace than bushing 16 the cost of maintaining track link assembly 10 is significantly decreased. It should also be appreciated that applying protective coating 46 only to the relatively small exterior surface 43 of seal member 42, as opposed to the relatively large exterior surface of bushing 16, also represents a significant cost savings with respect to the processes utilized for disposing protective coating 46.

While the invention has been illustrated and described in detail in the drawings and foregoing description, such illustration and description is to be considered as exemplary and not restrictive in character, it being understood that only the preferred embodiment has been shown and described and that all changes and modifications that come within the spirit of the invention are desired to be protected.

What is claimed is:

1. A track link assembly, comprising:
a first track link having a passageway defined therethrough;
a bushing having an end face, said bushing being positioned within said passageway;
a first seal member having an exterior surface, said first seal member being secured to said bushing end face; and
a protective coating secured to said exterior surface of said first seal member, wherein said protective coating and said first seal member are made of different materials relative to each other.

2. The track link assembly of claim 1, wherein:
said protective coating is a compound selected from the group consisting of chromium nitride and titanium nitride.

3. The track link assembly of claim 1, wherein:
said first seal member is secured to said bushing end face by an adhesive which forms a resilient bond between said first seal member and said end face.

4. The track link assembly of claim 1, wherein:
said protective coating is secured to said exterior surface of said first seal member by a process selected from the group consisting of a chemical vapor deposition process, a physical vapor deposition process, a sputtering deposition process, and a plasma spray process.

5. The track link assembly of claim 1, further comprising:
a second track link having a counter bore defined therein; and
a second seal member positioned within said counter bore, wherein said first seal member and said second seal member cooperate to form a seal between said first track link and said second track link.

6. The track link assembly of claim 5, wherein:
said end face of said bushing has a pilot seat defined therein, and
said first seal member is positioned within said pilot seat.

7. The track link assembly of claim 5, wherein:
said first seal member has a ring-like shape, and
said second seal member has a ring-like shape.

8. The track link assembly of claim 5, wherein:
said second seal member includes an elastomeric member which contacts said protective coating.

9. The track link assembly of claim 5, further comprising:
a load member positioned (1) within said counterbore, and (2) between said second track link and said second seal member, wherein said load member urges said second seal member towards said first seal member.

10. A track link assembly, comprising:
a first track link having a passageway defined therethrough;
a bushing having an end face, said bushing being positioned within said passageway;
a first seal member adapted to be positioned on said end face of said bushing; and
an adhesive in contact with each of said first seal member and said end face so that said adhesive forms a resilient bond between said first seal member and said end face.

11. The track link assembly of claim 10, further comprising:
a protective coating secured to an exterior surface of said first seal member, wherein said protective coating and said first seal member are made of different materials relative to each other.

12. The track link assembly of claim 11, wherein:
said protective coating is a compound selected from the group consisting of chromium nitride and titanium nitride.

13. The track link assembly of claim 11, wherein:
said protective coating is secured to said exterior surface of said first seal by a process selected from the group consisting of a chemical vapor deposition process, a physical vapor deposition process, a sputtering deposition process, and a plasma spray process.

14. The track link assembly of claim 10, further comprising:
   a second track link having a counter bore defined therein, and
   a second seal member positioned within said counter bore, wherein said first seal member and said second seal member cooperate to form a seal between said first track link and said second track link.

15. The track link assembly of claim 14, further comprising:
   a load member positioned (1) within said counterbore, and (2) between said second track link and said second seal member, wherein said load member urges said second seal member towards said first seal member.

16. The track link assembly of claim 14, wherein:
   said end face of said bushing has a pilot seat defined therein, and
   said first seal member is positioned within said pilot seat.

* * * * *